W. B. ENGLER.
FRICTION DRIVE FOR MOTOR VEHICLES.
APPLICATION FILED NOV. 23, 1914.
1,189,673.
Patented July 4, 1916.
2 SHEETS—SHEET 2.
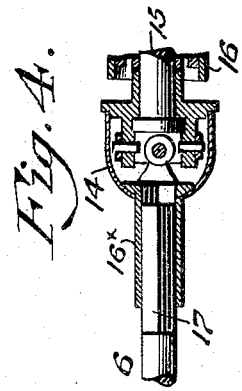
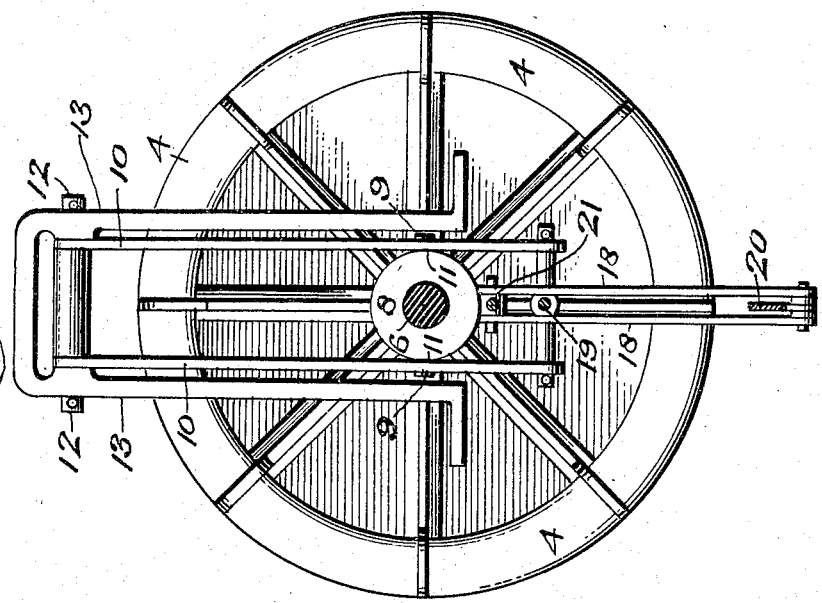
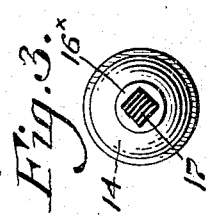
WITNESSES
D. F. Nagle
H. G. Dieterich
INVENTOR
William B. Engler
BY
ATTORNEYS

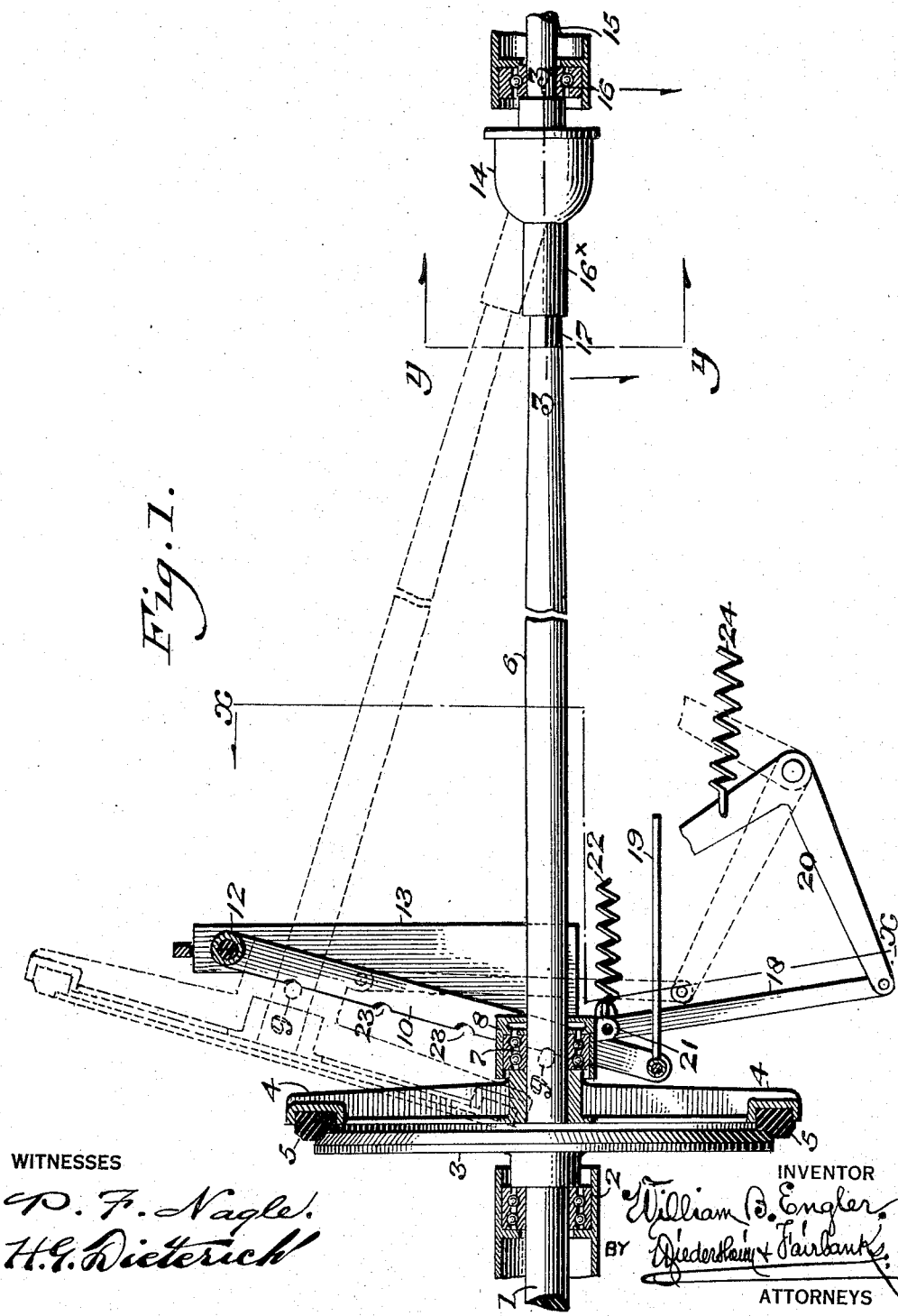

UNITED STATES PATENT OFFICE.

WILLIAM B. ENGLER, OF DETROIT, MICHIGAN.

FRICTION-DRIVE FOR MOTOR-VEHICLES.

1,189,673.

Specification of Letters Patent.   Patented July 4, 1916.

Application filed November 23, 1914.   Serial No. 873,486.

*To all whom it may concern:*

Be it known that I, WILLIAM B. ENGLER, a citizen of the United States, residing at Detroit, in the county of Wayne, State of Michigan, have invented a new and useful Friction-Drive for Motor-Vehicles, of which the following is a specification.

My invention consists of a friction drive for a motor vehicle which is designed to provide a variable speed and reversible power transmission for the same with high mechanical efficiency at the speed employed usually, and a simplicity of construction and operation, as will be hereinafter set forth, the novel features thereof being pointed out in the claims.

The invention is satisfactorily illustrated in the accompanying drawing, but the important instrumentalities thereof may be varied, and so it is to be understood that the invention is not limited to the specific details shown and described.

Figure 1 represents an elevation of a friction drive for a motor vehicle embodying my invention. Fig. 2 represents a transverse section thereof on the line $x$—$x$, Fig. 1. Fig. 3 represents a longitudinal section of a portion thereof on the line $y$—$y$ Fig. 1. Fig. 4 represents a longitudinal section of a portion on line $z$—$z$ Fig. 1.

Similar numerals of reference indicate corresponding parts in the figures.

Referring to the drawings, 1 designates a driving shaft employed for a motor vehicle, the same receiving power in any suitable manner, the same being mounted on the bearing 2 on the frame of the vehicle. Connected with the end of said shaft is the friction disk 3, to the rear of which is the spider 4 on whose periphery is the friction ring 5, which under normal conditions contacts with the disk 3 opposite thereto. Said spider 4 is connected with the auxiliary shaft 6, whose end adjacent thereto is mounted on the bearing 7, the latter being carried by the casing 8, the sides of which are provided with trunnions 9, which are engaged by levers 10 whose opposite side portions 11 straddle said casing 8 and whose outer ends are pivotally connected as at 12 with the bracket 13 on the frame of the vehicle. The free ends of said levers 10 have connected with them the link 19 adapted to be under control of the operator so that motions may be imparted to said levers 10, to be hereinafter further explained.

The end of the shaft 6 opposite to the casing 8 is connected by the universal joint 14 with the shaft 15 which is to be driven by the shaft 1 and intermediate mechanism, the several shafts together forming a sectional shaft, the shaft 15 being mounted in suitable bearings 16, the end of said shaft 6 slidingly entering the collar $16^x$ of said universal joint and being made square or angular as at 17 which freely enters a corresponding bore in said collar, whereby said shaft 6 may impart rotary motion to said joint, and consequently to the shaft 15, and may also slide in and out of said collar, in order to change its angular position as well as that of the spider 4.

Pivotally connected with the casing 8 is the link 18, whose opposite end is pivotally connected with the elbow or other levers 20 which are mounted on the frame of the vehicle, and by means of which the casing 8, the spider 4, and the friction ring 5 may be moved to the position shown in full lines or to that indicated by dotted lines, or to any intermediate position.

Connected with the ear 21 on the casing 8 and a suitable part of the frame of the vehicle is the spring 22 which is adapted to draw back said casing and the shaft 6, and hold the friction ring 5 from the friction disk 3.

In the edges of the levers 10 are recesses 23 which are adapted to receive the trunnions 9 of the casing 8 and so hold securely in that position, the casing 8, the shaft 6 and the spider 4, and particularly preventing shifting of said casing.

Connected with the levers 20 and a suitable part of the frame of the vehicle is the spring 24 which is designed to counterbalance the weight of the friction ring, the spider, the shaft 6 and connected parts.

It will be seen that when the parts are in their normal positions as indicated by the full lines, the friction ring 5 is parallel with the friction disk 3 and may be held firmly in contact therewith, and so the shafts 6 and 15 will be driven at the same speed and in the same direction as the shaft 1, said disk and ring being prevented from slipping or rubbing on each other and there is no waste of energy thereat. In this position, the axial alinement of the shafts 1 and 6 and the effectiveness of the drive is secured by the peripheral edge of the friction disk 3 being beveled and encircled by the overlapping peripheral edge of the ring 5. When the lever 20 is operated, the link 18 will move the casing 8 and so raise the lever 6, and with it the spider 4 and place the ring 5 at an angle to the side face of the disk 3 between the center and periphery of the latter, the spider by its trunnions being seated in the respective recess 23 of the levers 10 and so supported. Then the link 21 is operated whereby said levers are advanced to said disk and the ring 5 thrust firmly against the latter, as shown by the dotted lines when the speed of the shafts 6 and 15 will be slower than that of the shaft 1 and in the opposite direction, it being obvious that the friction ring may be brought to bear on the friction disk at places intermediate of the full and dotted lines so as to give various speed ratios by the shaft 1 to the shafts 6 and 15 and in the same direction of rotation.

Having thus described my invention what I claim as new and desire to secure by Letters Patent, is:—

1. In a friction drive for a motor vehicle, a driving shaft, an auxiliary shaft, a friction disk on said driving shaft, a member on said auxiliary shaft adapted to be carried by the same, and a friction ring on said member, the periphery of said ring being adapted to contact with the periphery of said friction disk and to overlap the same.

2. In a friction drive for a motor vehicle, a driving shaft, an auxiliary shaft, a friction disk on said driving shaft, a member on said auxiliary shaft adapted to be carried by the same, and a friction ring on said member, said ring and disk being adapted to be in contact, the edge of said disk being beveled, and the edge of said ring being adapted to overlap that of said disk.

WILLIAM B. ENGLER.

Witnesses:
C. GASKIN,
FRANCES T. BANNON.

Copies of this patent may be obtained for five cents each, by addressing the "Commissioner of Patents, Washington, D. C."